United States Patent [19]

Smith

[11] 4,291,200

[45] Sep. 22, 1981

[54] VOICE AND DATA SWITCHING ARRANGEMENT

[75] Inventor: Nicholas K. Smith, Middletown, N.J.

[73] Assignee: Bell Telephone Laboratories, Incorporated, Murray Hill, N.J.

[21] Appl. No.: 89,769

[22] Filed: Oct. 31, 1979

[51] Int. Cl.³ .......................................... H04M 3/58
[52] U.S. Cl. ........................ 179/18 BD; 179/2 DP; 179/18 E
[58] Field of Search .......... 179/2 DP, 18 E, 2 AM, 179/18 BD, 18 BE

[56] References Cited

U.S. PATENT DOCUMENTS 3,493,691  2/1970  Shimizu et al. .................. 179/18 E
4,055,729 10/1977  Vandling ......................... 179/2 DP
4,059,734 11/1977  Vanderbusse .................... 179/18 BD

FOREIGN PATENT DOCUMENTS 2218509 4/1973 Fed. Rep. of Germany ... 179/2 DP

OTHER PUBLICATIONS

"Rx for Data Terminal Blahs: The-non-blocking Switch", Jackovin, Telephony for Mar. 21, 1977, pp. 38-40.
"Transaction Telephone Gets the Facts at the Point of Sale", Borison, Bell Labs. Record for Oct. 1975, pp. 377 et seq.
"A New Electronic Switching System", Keister et al., IEEE Spectrum for Feb. 1965, pp. 87-94.
"Organization of the No. 1 ESS Stored Program", Harr et al., Bell System Tech. J., Sep. 1964, pp. 1923 et seq.

Primary Examiner—Thomas A. Robinson
Attorney, Agent, or Firm—John A. Caccuro

[57] ABSTRACT

A communication arrangement is disclosed which enables data calls between data terminals and a computer over a telephone network without significantly increasing the call blocking probability of the telephone network. When a data call, consisting of several data transactions is originated, the arrangement stores the called station information for later use in reestablishing a network connection on subsequent data calls between the same users. By disassociating the data terminal-computer data call signaling from the telephone network data call signaling, the telephone network is available for other data or voice traffic during the time when no data calls are active. A termination signal cancels the stored information and concludes the data call between the users.

13 Claims, 9 Drawing Figures

ORIGINATE

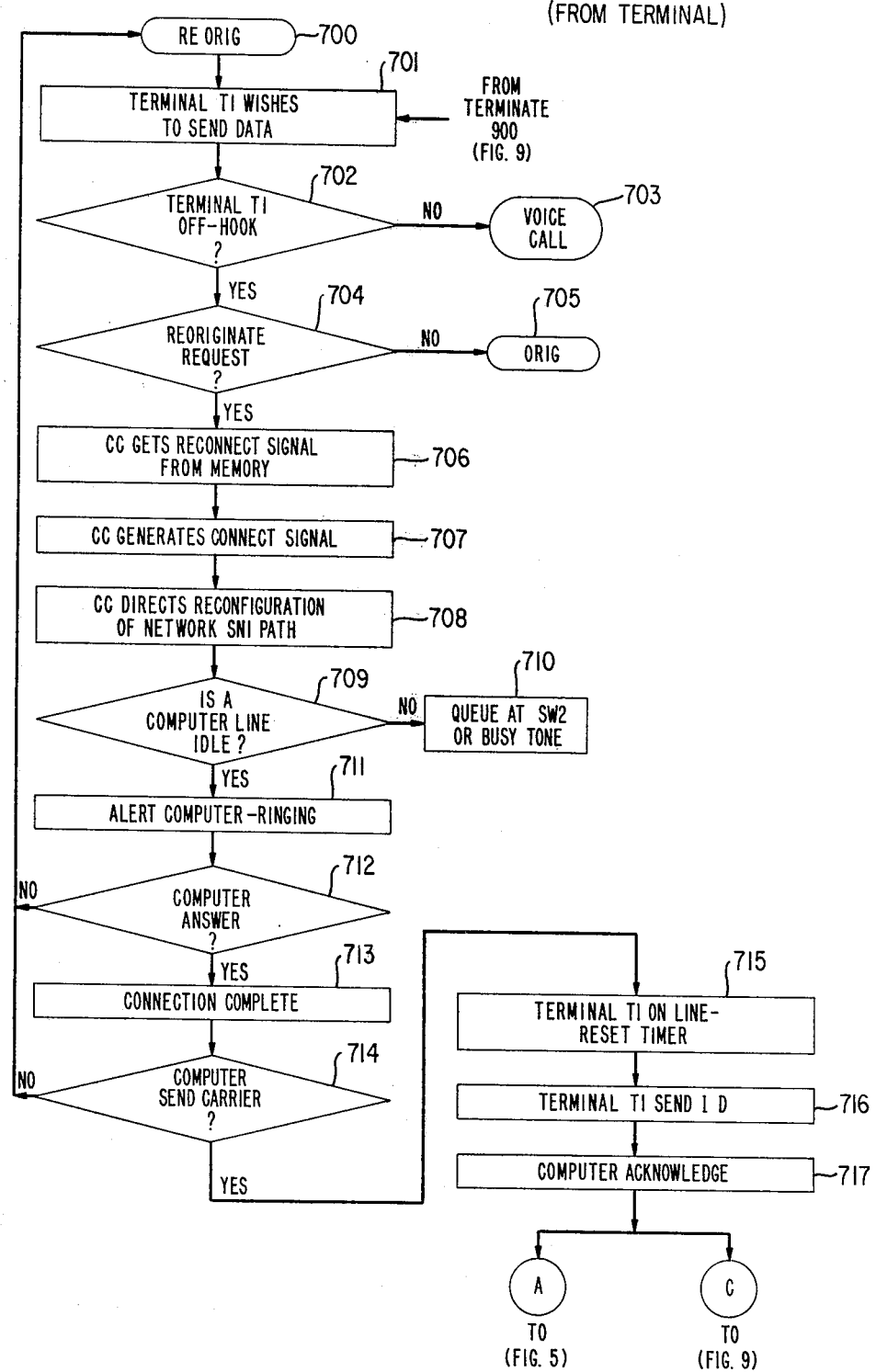

REORIGINATE
(FROM COMPUTER)

VOICE AND DATA SWITCHING ARRANGEMENT

TECHNICAL FIELD

This invention relates to communication systems and more particularly to a system for integrating data services onto a telephone communication system.

BACKGROUND OF THE INVENTION

The increasing need for data communication services is being accommodated today by using both separate data networks and by integrating data communication services over existing voice communication (telephone) networks. Some of these separate data networks, however, still rely on existing voice facilities for local access to their network. This ever increasing penetration of data services into the local voice facilities creates network traffic problems for the existing telephone network. These problems occur because the telephone network was initially designed for voice communications which has traffic characteristics that are different than those of data communications.

Data calls differ from voice calls primarily in the holding time (off-hook time) of the call and the amount of information conveyed per unit time during the call. The holding time, which is the length of time a call lasts, on average is much longer with data calls than with voice calls which typically last three to four minutes. This mismatch in the holding time characteristic causes usage problems in the telephone network and service problems for the user.

Data services can be categorized into three basic types. One type communicates a single data transaction per data call. An example of such a system is the transaction telephone as described in the article entitled "Transaction Telephone Gets the Facts at the Point of Sale", Bell Laboratories Record, at page 377 et seq., October, 1975 by V. Scott Borison. Using the transaction telephone the dialing and customer identification information are entered from a magnetically encoded card. In the transaction system the user goes off-hook, enters the dialing card information, enters the customer's identification card information and manually enters the transaction data. The computer's verification response is either visual or audible after which the telephone is placed on-hook. The above arrangement requires only a short holding time for each data call and enables the same telephone facility to be shared between voice and data services.

A second type of data service involves multiple interactive transactions to one computer center. This type of service typically involves going off-hook, dialing the computer center, entering the customer's identification, and entering a log-in sequence. This is followed by several data entries and computer responses conducted over a period of time. With this type of data service the telephone facility remains off-hook during the time when no data is being communicated. It is desirable for the data service to keep the line off-hook to both assure accessability to the data service computer on demand and to minimize the resulting protocol overhead (computer dialing customer's identification, log-in and log-out) which occurs when each data transaction is made using a separate data call. However, with such an arrangement the holding times are very long for each data call. Additionally, the long holding times make it impractical to share voice and data service over the same facility. Typical of this type of data service are inventory control systems and time shared software systems.

A third type of data service involves bulk data transactions which are either periodically polled from a computer center or periodically transmitted to a computer when a buffer is full. Such a system is typically not interactive since data entry and data responses do not occur in real time but are delayed until the buffer is full or until the unit is polled. Polling arrangements can be inefficient because the telephone line is periodically tied up on each polling inquiry to the customer whether or not the customer has any data to transmit. Such a polling arrangement also makes it difficult to share voice and data over a common facility.

The prior art single data transaction or bulk data services require sending dialing and user identification protocol information with each data transfer. If the number of data transfers per unit time is significant a multiple interactive type data service is often utilized enabling several data transfers during one data call. Only one protocol is required, since only one data call is established to enable the multiple data transfers. While the multiple interactive type data service reduces the protocol overhead required for data transfers, it does so at the expense of tying up the customer's loop during the period of time when no data is being transferred. In some arrangements, such as inventory control systems, the data call can last for an hour or more. The resulting long holding times (the time a line is off-hook) for each data call creates a call blocking problem for the telephone network.

The data call holding time problem is not as serious for the single data transaction or bulk data services. However, since the single data transaction data service requires the establishment of a telephone connection (data call) for each data transfer the number of calls which can be made in a given time period is limited. Hence, such a service is not recommended for high usage data services. The bulk data services accumulate data for a period of time and send it during one data call. Because of the delay involved, this service cannot effectively operate as an interactive real-time data service. Thus, for customers requiring multiple interactive real-time data transfer capability the only data service available in the prior art utilizes long holding time data calls which create significant call blocking problems for the telephone network.

The resulting telephone network blocking problems occur because line concentrators of the telephone switching equipment are designed to match the short holding time traffic characteristics of the telephone customer's voice communications. These line concentrators are designed to efficiently concentrate many customer lines to a fewer number of expensive trunk circuits which require high usage for economic telephone service. When this average holding time increases drastically, due to increased numbers of data calls each having long holding times, the traffic density increases and the probability of one party being unable to reach another party (i.e., blocking probability) increases.

The blocking problem is more acute at the telephone termination switching office of the computer vendor who operates the data communication service. This vendor is usually equipped with many central office lines to handle his own traffic requirements. When these lines are blocked by data calls having long holding times, the resulting congestion at the terminating switching office can back up into other telephone offices creating additional telephone network congestion. Typically, this blocking problem is not solved by using separate data communication networks since these data networks generally utilize the local telephone facilities rather than private facilities for user data distribution. The final result of this increased blocking probability is a degradation of both voice and data services over the telephone network as well as a degradation in the services offered by the computer vendor.

An additional effect of the call blocking problem is that the data communication user has no voice telephone service while he is currently making a data call. The situation is particularly troublesome for the small business customer who relies on his voice telephone to do business. Thus, most customers who require frequent data communications install a separate data communication line in addition to their voice telephone line.

Thus, it is a general problem to decrease the telephone service degradation resulting from allowing data services access to the telephone network.

SUMMARY OF THE INVENTION

The disclosed invention solves the above problem of merging data services with voice services over the same network by allowing a data customer to maintain a data transaction active in the memory of the switching machine while limiting the use of the telephone network facilities to the time the data customer is actually transmitting or receiving data. The time during which a user is actually transmitting or receiving data is referred to herein as a data call.

Thus, for the interactive type data service a customer will not appear to the network as being off-hook during the entire data transaction (several data calls) but will be off-hook only during the actual data call. Consequently, the customer's accessability to the data service computer is not assured as when the telephone switching connection is left off-hook during the entire data call. However, the reduced blocking probability which results when one long holding time call (during the entire data transaction) is separated into several short holding time calls (one for each data transfer of the data transaction) improves the overall data customer accessability to the data service. The overhead (computer dialing, customer's identification, log-in and log-out) which results when each data transfer is a separate data call is reduced since the telephone network has stored the computer's telephone number and the customer's identification number. Additionally, the data service computer is modified to recognize that an on-hook signal from the telephone network does not mean the termination of a data transaction, but instead is interpreted as a signal which indicates that this particular data call is ending and that more data is forthcoming as part of the data transaction. Hence, the on-hook and off-hook line (data call) status is disassociated from the origination and termination of a data transaction. Thus, once a data transaction is originated, subsequent off-hook operations causes the switching network to reestablish the data connection without the need for extensive overhead signaling. The result is an efficient data transaction having a short holding time which imposes an insignificant additional traffic load onto the telephone switching network and facilities. The "freeing up" of the local telephone loop also make possible the sharing of voice and data services over the same loop using appropriate multiparty signaling techniques. In such an arrangement a multiparty control circuit interfaces the loop to the switching machine and performs a standard two-party identification test to distinguish a data call from a voice call.

The disassociation of the on-hook and off-hook line signaling from the origination and termination signaling of a data transaction is accomplished by the disclosed arrangement as described hereinafter. A data terminal originate signal, which is sent when a user's data terminal initiates a data transaction, is used to distinguish a data transaction from a voice call. This originate signal not only "logs-in" the caller to the computer data service, but "logs-in" the caller to the telephone switching system at the same time. A control circuit of the telephone switching machine is responsive to the originate signal, received over the communication line from the user's data terminal, to generate a connect signal. The connect signal controls the switching network of the telephone switching machine to establish the desired connection path to the computer data service. The control circuit also stores a reconnect signal in memory for use with subsequent data transactions.

After the data transfers and the computer responses are completed the data call network connection is dropped. However, within the telephone switching system call memory, the data transaction remains active. Any subsequent data call from this user requires a brief reoriginate signal which is identified automatically by the telephone switching system. The telephone system obtains the appropriate reconnect signal stored in memory and generates a connect signal establishing the connection for another data call to the computer. In the preferred embodiment of the system an off-hook signal provides the reoriginate signal from the user.

In the disclosed system a very long holding time call becomes a series of very short holding time data calls as far as network traffic is concerned. The total holding time is also less because no connection exists during the time a user is thinking of what next to transmit. Thus, when the user is in the middle of a data call, that is when the user is still logged on the telephone switching system, he only has control of the line and trunks while he is actively transmitting or receiving data. Reducing the total holding time of the data calls results in a significant reduction in the probability of blocking the telephone switching system to other callers. Consequently, the trunks are free for other calls, the line is free for other services, data or voice, and the computer port is free for other data users.

Note, when a user is in the middle of a data transaction, his line may be idle (on-hook) but he is considered busy to any new data call directed to him. However, an additional embodiment provides a reoriginate capability for the called computer. Thus, while the transaction is active the computer can reoriginate a data call to the user by dialing a separate reoriginate telephone number of the user. The arrangement recognizes this special telephone number and enables the connection to the user.

Although the user in the middle of a data transaction is considered busy to any new data call, he is considered idle to any voice call to him. Loop supervision signaling from the multiparty control circuit is used to distinguish a voice call from a data call as previously discussed. If the user is in the middle of a data transaction and wishes to originate a voice call, he must go off-hook and generate a voice origination signal. The multiparty control circuit of the telephone switching system detects this signal and enables a dial tone to the user. The user then dials the desired party and completes his voice call. Note, any additional data transactions can be resumed after the completion of the voice call.

At the conclusion of the data transactions, a terminate signal from the user tells the telephone switching machine that the user wishes to terminate the data transaction. This is similar to a "log-out" procedure in computer communications. This data transaction termination procedure involves sending a signal to the telephone switching system which is detected by its scanning circuits. When the telephone switching machine receives a data call termination signal, the user's reorigination signaling capability is cancelled. The control circuit of the telephone switching machine generates a disconnect signal and cancels the stored reconnect signal. Thus, the caller is logged out at both the computer and the telephone switching system. In one embodiment the data call termination signal is an inverse switchhook flash signal during which the telephone loop to the data user is temporarily switched from an on-hook to an off-hook and back to an on-hook condition.

An embodiment of a data terminal of the telecommunication arrangement is disclosed for providing the data transaction and data call signaling associated with data transfers. Alternately, an embodiment of an adjunct unit is disclosed for use with a standard data terminal for providing the required signaling.

Thus, by disassociating the data terminal originate signal from on-hook/off-hook loop supervision signaling a reduced holding time and a resulting decrease in blocking probability of the telephone network is obtained. Since the data transaction, once established by the originate signal from the data customer, remains established in the memory of the switching machine, the switching machine provides the reconnection signaling for subsequent data calls from the data customer. This reconnection signaling from the switching machine is responsive to the data customer's off-hook signal. During on-hook conditions of the data customer, the time during which no data transmission exists, the telephone loops and trunks of the switching machine are made available to other telephone users. The data channel is cancelled in the memory of the switching machine when a terminate signal is received from the data customer.

BRIEF DESCRIPTION OF THE DRAWINGS

The operation and utilization of the disclosed invention will be more apparent from the following detailed description taken in conjunction with the drawings in which:

FIG. 6 illustrates the association of FIG. 4 and FIG. 5;

FIG. 7 illustrates the operational sequence for a reoriginate data transmission from the calling data terminal;

DETAILED DESCRIPTION

Figure 1:
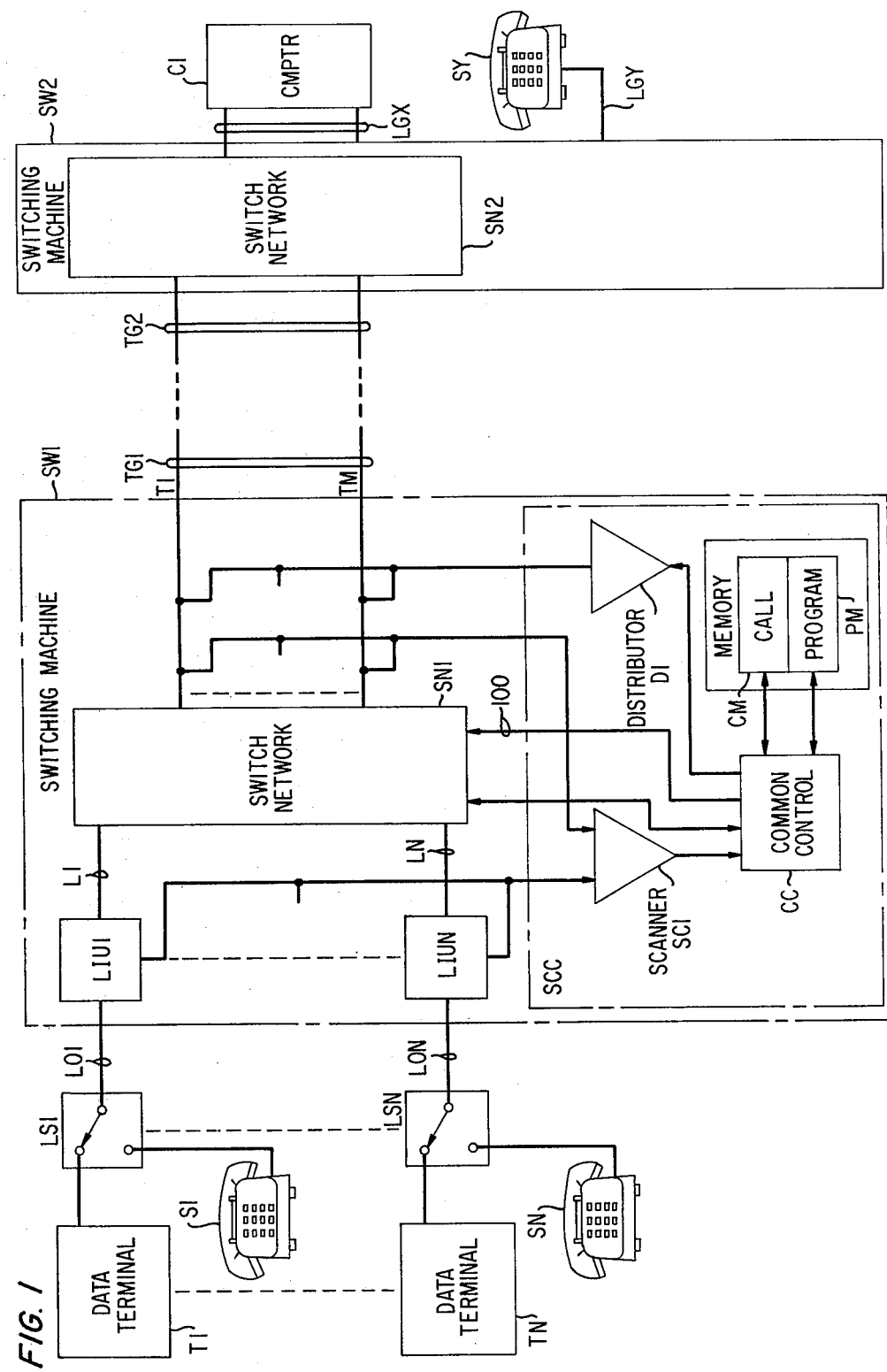
FIG. 1 shows a block diagram of a data terminal connection to my telecommunication system.

Shown in FIG. 1 is a block diagram of a connection of a plurality of data terminals (T1–TN) and telephones (S1–SN) connected to a switching machine (SW1) over telephone loops (LO1–LON). Switching machine SW1 connects via trunks (T1–TM) of trunk group TG1 to trunk group TG2 of switching machine SW2. Switching machine SW2 connects to computer C1 via telephone loop group LGX and connects to telephone SY over telephone loop LGY. Data services between a user at data terminal T1 and computer C1 are switched through switching machines SW1 and SW2. Note, depending on the geographic location of computer C1 and data terminal T1 they may share the same switching machine.

Figure 2:
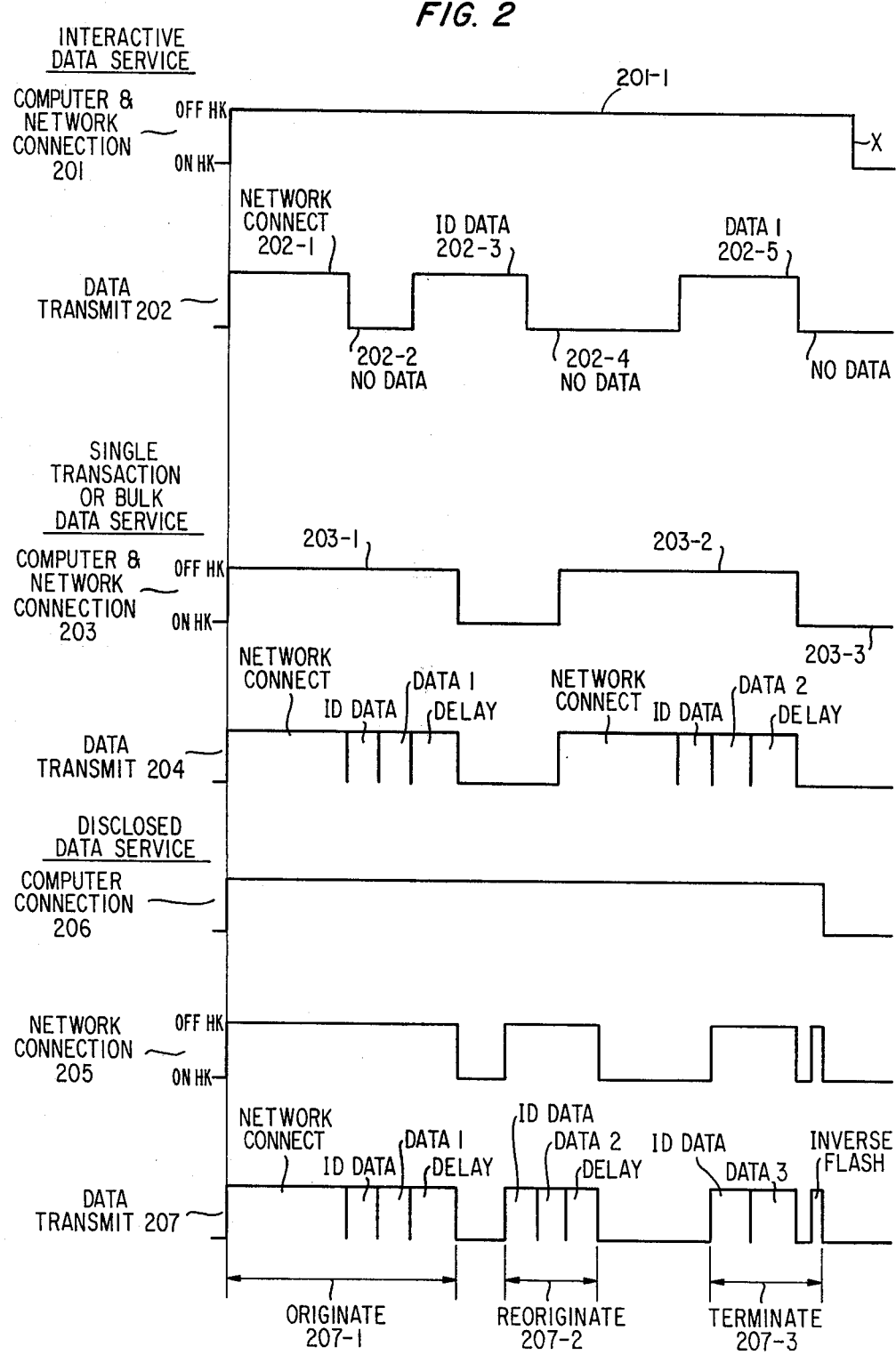
FIG. 2 compares the holding times of two types of existing data communication services with the holding time of my telecommunication system.

A review of prior art data services using the timing diagrams of FIG. 2 will help distinguish them from the data service provided by the disclosed voice and data switching arrangement. Typically, interactive data service is provided using an arrangement utilizing a telephone station and an acoustically coupled data terminal. The interactive data service is typically utilized in applications where there is a frequent number of data transactions between the data terminal and computer. In such a service arrangement, graphically shown as interactive data service 201, 202 on FIG. 2, a data terminal user initiates a data call transaction by going off-hook with the telephone waiting for a dial tone. The user then dials the telephone number of the computer data service. A visual or audible response from the computer data service to the data terminal indicates when a connection is made. The handset is then placed into the acoustic coupler of the data terminal. Alternately, a button on the telephone set can be wired to connect the data terminal directly to the telephone line.

The dialing period of time is illustrated as the network connect time 202-1 shown on 202 of FIG. 2. After the visual or audible response from switching machine SW1 there is no data presently being transmitted on the line (202-2). The user then typically identifies his terminal number, the name of the system he is trying to access, his personal identification code and perhaps a security password (202-3).

The computer, after digesting the input, responds with a "ready" or "continue" signal to the user during time 202-3 after which the line is quiet again 202-4. Data transmission DATA1 from the user and the computer response are shown in 202-5. If no additional data transmission is to be made, the terminal typically utilizes an automatic time out, after which time the telephone loop goes on-hook, (X of 201) or the user can send a data transmission indicating a data termination (not shown) after which the telephone loop goes on-hook. Alternately, if the terminal goes on-hook the computer will time out and terminate the data call.

As shown by 201, the computer and telephone network connection are established and terminated concurrently and thus the described data service requires only one network connect and identification data transmission sequence per data call. Disadvantageously, however, this type of data service keeps the telephone loop in the off-hook condition (201-1) during the time when no data (202-2, 202-4) is being transferred between the data terminal and computer. The resulting long call holding time (201-1) creates traffic problems in the telephone switching systems (SW1 and SW2 of FIG. 1) and problems as described in an earlier paragraph.

Another type of data service available in the prior art operates as illustrated by waveforms 203 and 204 of FIG. 2. This type of data service arrangement typically accumulates data in bulk and periodically transmits the bulk data to a computer. Such a data format is also used in single transaction data services such as credit card verification. With this type of data service, since there is no wasted time between the data messages, the telephone line is utilized for data transmissions for a large percentage of the time that it is off-hook (203-1). While this type of data service does not keep the telephone loop off-hook for as long a period of time as does the interactive type data service (i.e, shorter holding times 203-1 and 203-2), there is a necessity of retransmitting the network connect and ID data with each data burst sent to the computer. Additionally, such single transaction or bulk data service is not practical for interactive real time data services because of the time and effort needed to reestablish the data call connection for each data transmission.

The data service provided by the disclosed voice and data switching arrangement is illustrated by 205, 206 and 207 of FIG. 2. In such an arrangement the network connect signaling, used to establish the data transaction is contained only in the originate transmission burst 207-1. Thus, the computer connection 206 remains established independent of the status of the telephone network connection 205. Additionally, depending on the implementation of the central office, ID data may not be required in any reoriginate transmission 207-2. Thus, the reoriginate signaling 207-2 can be merely an off-hook signal from the data terminal followed by the data burst. However, since an on-hook condition no longer indicates the end of a data transaction the termination of a data transaction requires a terminate transmission signal 207-3 to identify to the computer that the data user wishes to log-out and to signal the switching machine to terminate the network reorigination connection capability. If a time out capability, operable between data transmissions, is available with the computer data service a separate log-out signal is not required. Additionally, a time out capability at the switching machine could also automatically terminate network connections as well as signal a log-out condition to the computer data service.

Thus, the disclosed voice and data switching arrangement enables interactive real-time data services to operate over existing telephone loops without requiring the long holding (off-hook) times of prior data service arrangements. Consequently, telephone loops (LO1–LON) can be time shared, during the on-hook period, with either a telephone or a second data terminal. Additionally, the resulting shorter holding time makes trunks T1-TM more readily available for other calls. The resulting shorter holding times of the data calls reduces the blocking probability of switching machines SW1 and SW2. To more completely understand the disclosed invention, a basic description of the operation of a telephone switching network is briefly provided below. Switching machines SW1 and SW2 illustrated in FIG. 1 are No. 1 Electronic Switching System (No. 1 ESS) machines although the invention will function with other switching machines which can implement the controls described in the flow charts contained in this application.

The operation of the No. 1 ESS machine is centered about a stored-program real-time processor which controls the central office operations and enables modification and addition of features at a relatively low cost. An overall description of the No. 1 ESS machine is described in the article entitled "A New Electronic Switching System", IEEE Spectrum, Vol. 2, pp. 87-94, February 1965, by W. Keister, et al., which is incorporated herein by reference. Switching network SN1 allows interconnection between links L1-LN and trunks T1-TM as well as to the various service circuits required, including the source signaling detectors, and the ringing service. Line interface units LIU1-LIUN receive status and provide control to telephone loop facilities LO1-LON. Scanner SC1 and distributor D1 provide periodic access to the loops, trunks and signaling devices. The scanner SC1 is an inputting device while the distributor D1 is an outputting or controlling device. Common control CC handles the call processing and utilizes a temporary call memory CM and a permanent program memory PM. The call memory CM stores the transient information required for processing calls such as the digits dialed by the subscriber as well as busy and idle states of the loop and trunks. Program memory PM contains the stored program and translation information.

The operation of the various units of switching machine SW1 are understood better by following the description of a typical telephone call between subscribers at telephones S1 and SY. Note, this same description also applies to a data call connection sequence between data terminal T1 and computer C1. Assume line switch LS1, to be described later, is switched to connect subscriber telephone S1 to loop LO1 and switching machine SW1. When a subscriber at telephone S1 lifts the handset to initiate a call, common control CC detects this event via line interface LIU1 and scanner SC1. Common control CC utilizes information in program memory PM to select a dial pulse receiver or touch tone receiver (neither are shown). A path is established between the dial pulse or touch tone receiver and the subscriber S1 and dial tone is provided to the calling subscriber. The dial pulse receiver or touch tone receiver then detects, respectively, the digits dialed or the touch tones entered by the subscriber at telephone S1.

When the calling subscriber at telephone S1 initiates dialing, common control CC stores the data in call memory CM. At the completion of the dialing sequence common control CC, operating under program memory PM control generates a connect control signal 100 which causes switch network SN1 to select a talking path between link L1 and a trunk of trunk group TG1. The data required to establish the connection to the called party is sent either via interoffice signaling over the selected trunk or via a common channel interoffice signaling (CCIS) path to switching machine SW2. The dial pulse or touch tone receiver is then disconnected from calling subscriber S1.

Common control CC at switching machine SW2 connects a ringing circuit to loop LGY connected to called telephone SY. An audible ringback tone is delivered from switching machine SW1 to the calling subscriber at telephone S1 so that he can "hear" the called subscriber's telephone ring.

The common control unit at each switching machine SW1 and SW2 monitors the respective calling or called subscriber's line for a calling subscriber's hang up or called subscriber's answer. When the called subscriber answers telephone SY the ringing circuit is disconnected and a talking path established for loop LGY. The common control units continue to monitor the talking path for a "hang up" termination of the call after which the talking path between subscribers S1 and SY are disconnected.

Figure 4:
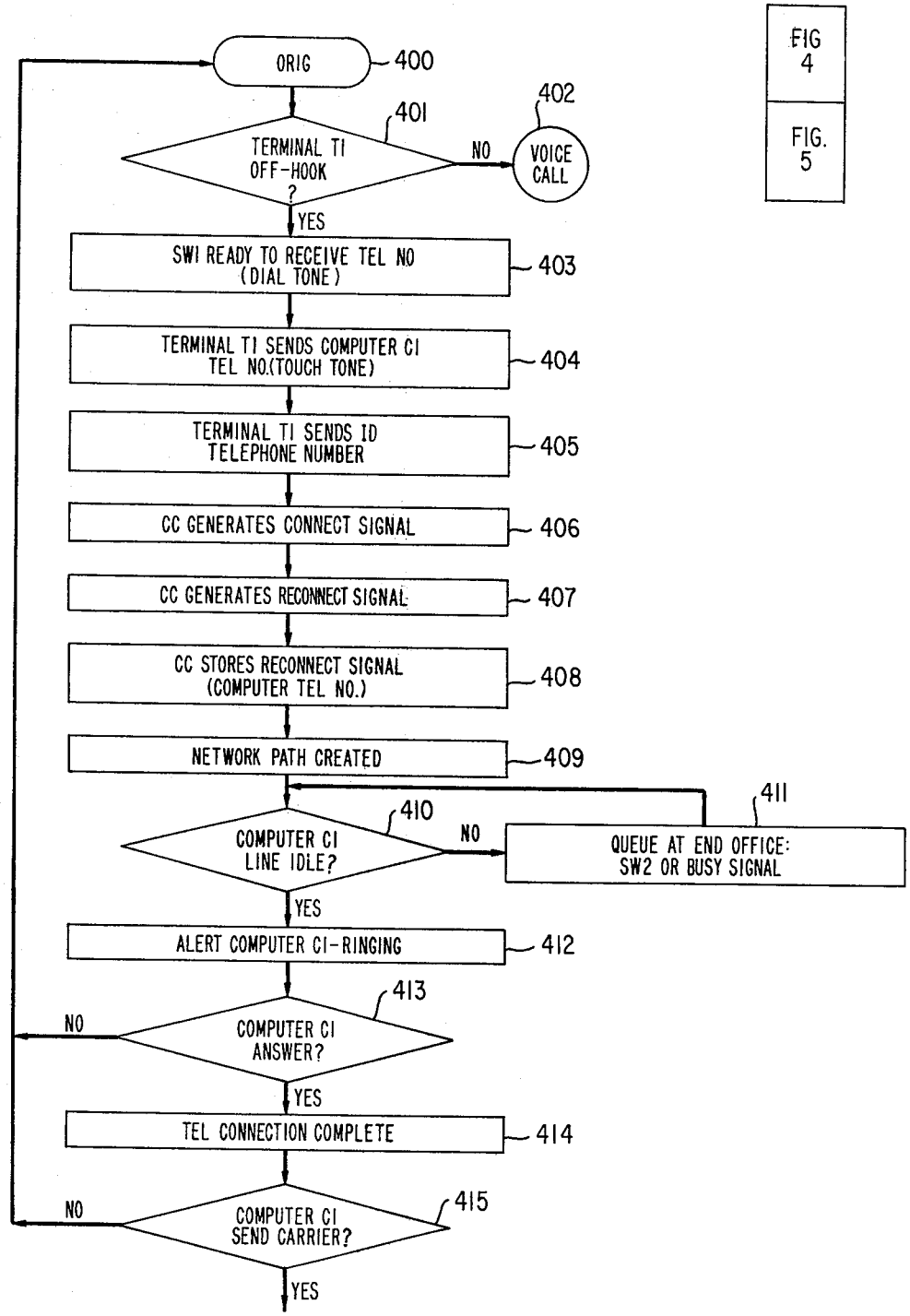
FIGS. 4 and 5 illustrate the operational sequence for an originate data transmission from a calling terminal.
Figure 5:
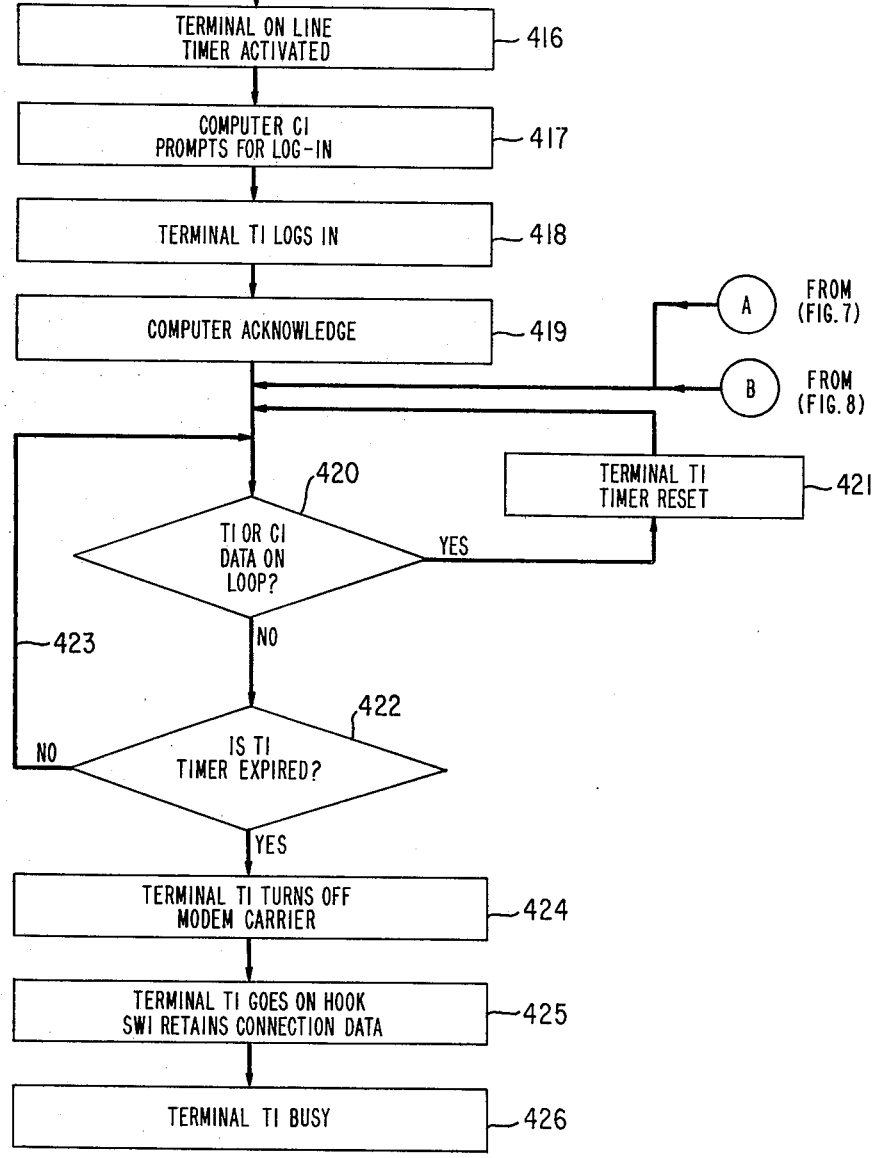

Data Call—Originate—FIG. 4

The sequence of signaling for a data call connection is identical to that of the previously described telephone call except that the called customer is a computer which answers with a carrier tone instead of "hello". Once the connection is established, additional signaling or data is communicated rather than voice signals. The termination of a data call results from either communicating such a request over the talking path or from timing out after a period of inactivity.

The functional details of the operation of my invention are described in the sequence charts of FIG. 4 through 9 which are stored in program memory PM of switching machine SW1. The particular functional steps are well known and are similar in operation and implementation as those described in the article entitled "Organization of the No. 1 ESS Stored Program", Bell System Technical Journal, Volume XLIII, pp. 1923 et seq, September 1964, by J. A. Harr, et al. The other articles contained in the above issue entitled "No. 1 Electronic Switching System", Bell System Technical Journal, September 1964, provide excellent background information on the various operational aspects of a switching machine which can be arranged to implement my invention.

Figure 3:
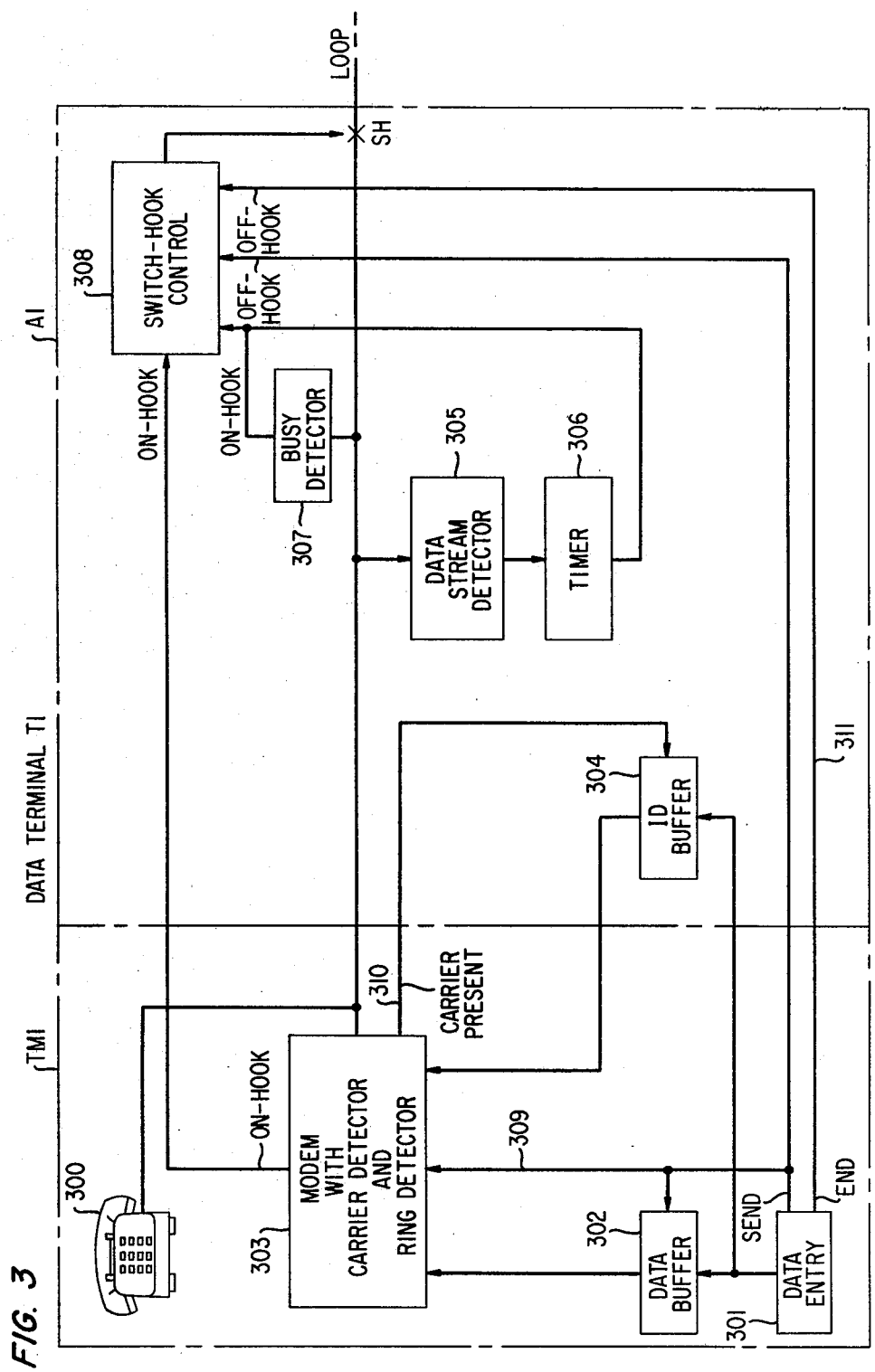
FIG. 3 illustrates a typical data terminal circuit used in my arrangement.

FIG. 3 illustrates the architecture of data terminal T1 used with the disclosed voice and data switching arrangement. Typically, a standard data terminal is comprised of a telephone 300, a data entry unit 301, a data buffer unit 302 and a modem 303. Once a connection is established to the data service's computer, as previously described with reference to FIG. 2, the user makes data entries 301 which are stored in data buffer 302. At the completion of the data entry a carriage return signal normally signals modem 303 to begin transmission of the data. Note, data buffer 302 may not be required if a character by character data transmission terminal is desired. Data terminal T1, shown in FIG. 3, which is utilized with the disclosed system requires the additional units such as ID buffer 304, data stream detector 305, timer 306, busy detector 307 and switchhook control 308.

The operation of data terminal T1 will be described together with the flow charts of FIG. 4, 5, 6, and 7. The operational sequences described by the flow charts of FIG. 4, 5, 7, 8 and 9 are implemented as part of switching machine SW1 of FIG. 1. These operational sequences are stored in program memory PM. The reconnect data, which is utilized to reoriginate a call to the computer, is stored in call memory CM. Common control CC utilizes the sequences stored in program memory PM to process data calls using the same receivers, registers, scanners and distributors of switching machine SW1 in a manner similar to the previously described voice call processing.

With reference to FIG. 3 a customer originates a data service request by going off-hook at telephone set 300 of data terminal T1. If, as shown in FIG. 1, loop LO1 is shared by data terminal T1 and telephone set S1, switching machine SW1 does a standard two-party test 401 to determine whether data terminal T1 or telephone set S1 is off-hook. If telephone station S1 is off-hook, a voice call is processed 402 as previously described. The remainder of the sequence shown in FIG. 4 is activated only when the off-hook is initiated by a customer at data terminal T1. Switching machine SW1 provides dial tone 403 indicating it is ready to receive telephone number of the called party. Note, prior to switching machine SW1 placing dial tone on the telephone loop (line) to data terminal T1, call memory CM (of FIG. 1) is checked for the presence of an existing data call between data terminal T1 and computer C1. If there is an existing data call in progress, the off-hook condition at data terminal T1 indicates to switching machine SW1 that the request is a reoriginate request rather than an originate request. A reorigination request will be described in a later section of this application. Assuming that there is no existing data call in progress an off-hook at data terminal T1 represents an originate request and hence switching machine SW1 responds with dial tone as described previously.

Returning to FIG. 4, after the customer at data terminal T1 receives dial tone 403 the telephone number of data service computer C1 is dialed 404. The customer at data terminal T1 enters terminal ID information 405. As previously described for a voice call common control CC of FIG. 1 generates a connect control signal 406 to establish a connection in switching network SN1. A reconnect signal 407 (equivalent of computer telephone number) is generated and stored 408 in call memory CM for use during a reoriginate request from the subscriber at data terminal T1. In a manner described previously for voice telephone calls a switching network path 409 is established, with reference to FIG. 1, from the customer at data terminal T1 through switching machines SW1 and SW2, trunk groups TG1 and TG2, to computer C1 via one of the lines in line group LGX. Switching machine SW2 checks 410 whether one of the lines to computer C1 is idle. If no line is idle 411, either a queue is established at switching machine SW2 or a busy signal is returned to data terminal T1. Referring to FIG. 3, the busy tone is received through telephone set 300 and the customer knows to try again. A busy detector 307 can be utilized which would automatically return data terminal T1 to the on-hook condition and give a visual indication of such a condition. When a queue is established at switching machine SW2 a unique tone could be returned to the calling customer indicating such a condition. During the queue time data terminal T1 remains off-hook awaiting the computer connection.

If a line to computer C1 is idle, a ringing signal 412 from switching machine SW2 is outputted to computer C1. If computer C1 does not answer 413, as during a computer malfunction, the customer knows to try a new originate request 400. Note, busy detector 307 can be arranged to detect this unique tone and return data terminal T1 to the on-hook condition and provide an associated visual signal to the user. If computer C1 answers 414, the telephone connection is completed by switching machines SW1 and SW2 in a manner as described previously for a voice telephone call.

Computer C1 either (415) sends a carrier signal 416 to data terminal T1 indicating that the connection is complete and the computer C1 is ready to communicate directly with data terminal T1 or sends a unique signal to data terminal T1 indicating that the customer should try again (400).

Assuming that a carrier signal is returned to data terminal T1, a timer (306 of FIG. 3) is activated 416 and data terminal T1 goes on line. Returning to FIG. 5 computer C1 prompts 417 terminal T1 for log-in data 418. The customer logs-in via data entry unit 301 of FIG. 3 which loads data buffer 302. Note, another terminal ID could be entered as part of the log-in sequence. At the completion of the data entry a send key (carriage return or some other key) is pressed activating modem 303 via line 309 to transmit the contents of data buffer 302.

After terminal T1 logs-in 418, a process for initializing computer C1, computer C1 acknowledges 419 this condition to data terminal T1. Note, each terminal T1 or computer C1 data transmission is detected by data stream detector 305 of FIG. 3 which then resets timer 306 (the timer which was activated in step 416 of FIG. 4). The timer value is established such that an operator can normally fill the data buffers before the timer expires.

After terminal T1 has logged-in with computer C1, data transfer between the two can begin. Referring to FIG. 3 data is entered via the data entry unit 301 filling data buffer 302. When data buffer 302 is full the customer presses the send key generating a send signal 309 which signals modem 303 to transmit the contents of data buffer 302. Thus, the exchange of data between data terminal T1 and computer C1 continues while data detector, 305 of FIG. 3, monitors the telephone loop (420 of FIG. 5). Terminal timer 306 of FIG. 3 is reset (421 of FIG. 5) when data is detected on the loop. The time value of timer 306 is determined according to the type of data service utilized. The operating sequence calls for periodic checks of the status of terminal timer 306 as shown on 422 of FIG. 5. If terminal timer 306 has not expired, the telephone loop is constantly rechecked for data 423. When the timer expires, data terminal T1 turns off modem carrier 424 and goes on-hook 425. Common control CC stores a data call busy status 426 for the telephone number associated with terminal T1. Thus, any origination data calls to terminal T1 receive a busy response signal.

Referring to FIG. 3, when terminal timer 306 expires an on-hook signal is given to switchhook control 308 which then opens up contact SH disconnecting data terminal T1 from the telephone loop LO1. Switching machine SW1 detects this on-hook signal, interprets it as an end of connection signal and disconnects the trunk to loop connection in switching network SN1. Note, however, that switching machine SW1 has stored in call memory CM the computer's telephone number and any required data call designation information. The terminal ID information is provided by terminal T1 rather than by switching machine SW2. After terminal T1 goes on-hook, switching machine SW2 disconnects the loop and trunk connections to computer C1 when the on-hook signal condition is detected.

When computer C1 is disconnected from the loop during an on-hook condition, it has been programmed to recognize that a data transaction is not complete and more data will be forthcoming in another data call and hence the computer does not log-off data terminal T1. Note in existing data services on-hook condition in the middle of a data transaction results in computer C1 discarding the previous partial transmission.

Reoriginate from Data Terminal—FIG. 7

When the customer at data terminal T1 has another data call 701 for computer C1 a network reconnection must be established through switching machines SW1 and SW2. Since switching machine SW1 has stored the reconnect information (telephone number of computer C1) the customer's data terminal T1 need only go off-hook to signal the reoriginate sequence to switching machine SW1.

When the off-hook condition of loop LO1 of FIG. 1 is detected, common control CC checks 702 whether voice telephone set S1 or data terminal T1 has gone off-hook. If voice telephone set S1 has gone off-hook common control CC initiates normal telephone dial tone operation 703. Assuming data terminal T1 goes off-hook, common control CC detects this off-hook signal and checks 704 the contents of call memory CM to determine if data terminal T1 request is an origination 705 or a reorigination request 706. Assuming that a prior origination data call was made, switching machine SW1 gets the stored network reconnect information 706 from the call memory CM, generates a connect signal 707 and reestablishes a telephone network connection 708 between data terminal T1 and computer C1. The previously described well known telephone switching machine techniques are used for accessing and translating the information into the desired format needed to effectuate a network connection path.

With reference to FIG. 3 a reoriginate sequence occurs at data terminal T1 after data is entered via data entry unit 301 into data buffer 302 and the send button is pressed generating send signal 309. Send signal 309 signals switchhook control 308 to place data terminal T1 in the off-hook status. Note the reoriginate sequence shown in FIG. 7 saves the time required to apply the dial tone and receive the dialed computer telephone number. In a manner similar to the originate sequence the telephone lines of computer C1 is checked and rung, if not busy, as shown in steps 709, 710, and 711. Once the connection to computer C1 is complete 712, 713 and carrier sent 714 data terminal T1 is on line 714.

The terminal ID information 716 can be automatically sent, referring to FIG. 3, by ID buffer 304 after reception of a carrier present signal 310 from modem 303. Alternately, switching machine SW1 could provide the terminal ID information if it had circuitry to detect when to send this ID information and means to superimpose this ID information on the line. After the computer acknowledgement 717 of FIG. 7, the remaining steps required for data transmission during a reoriginate sequence proceed as illustrated at location "A" of FIG. 5.

Thus, for data services requiring multiple interactive data transmissions between a data terminal and the same computer the disclosed circuit has enabled multiple short holding time data calls to replace a single data transaction having a much longer holding time. These short holding time data calls are effectuated without the overhead protocol penalty which normally accompanies each data call in prior data services.

Figure 8:
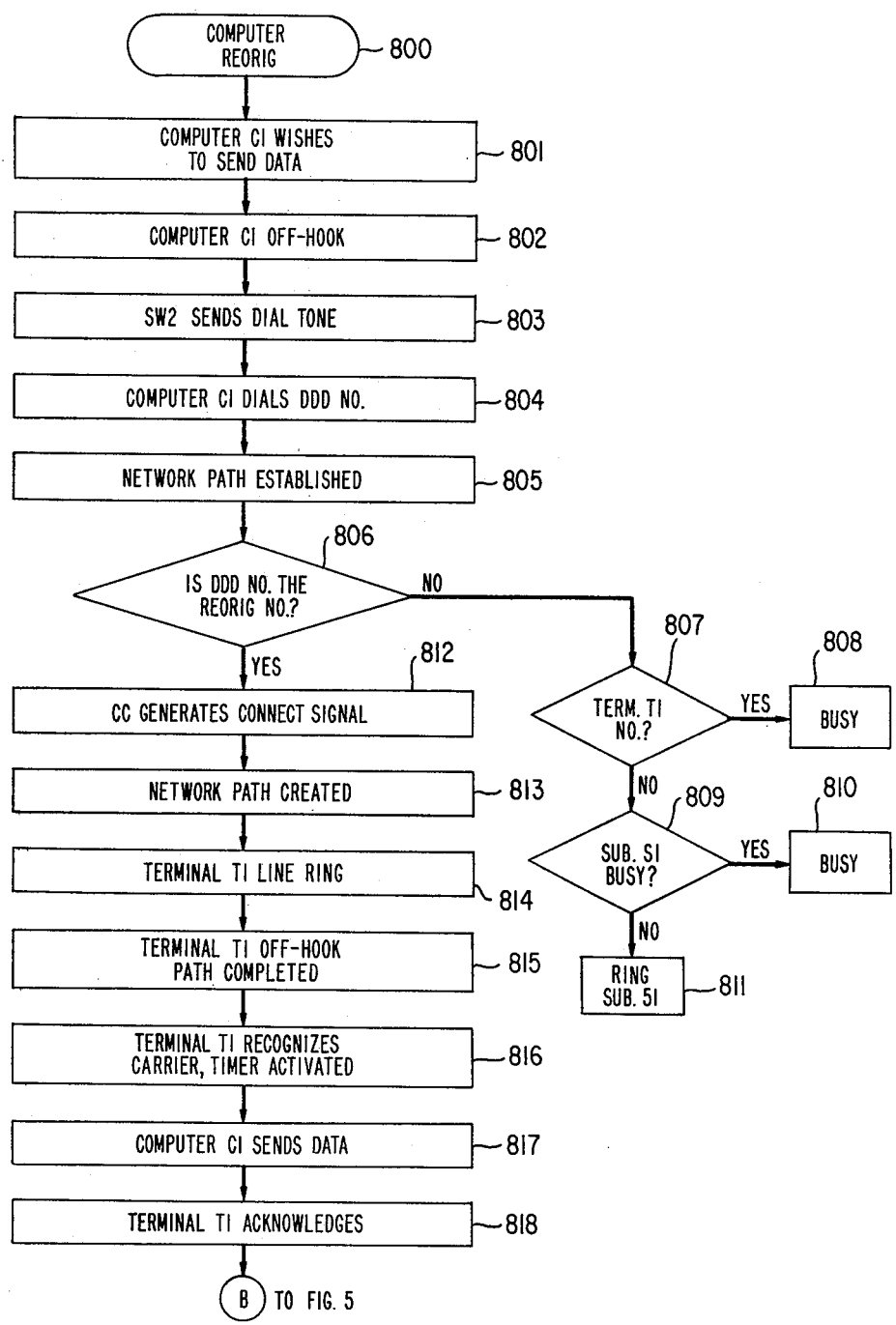
FIG. 8 illustrates the operational sequence for a reoriginate data transmission from the called data service computer.

Reoriginate from Computer—FIG. 8

During the processing of an active data transaction the called computer C1 can contact calling data terminal T1 using the following sequence. Referring to FIG. 8, when computer C1 desires to send data 801 it goes off-hook 802 and receives dial tone 803 from switching machine SW2. Since data terminal T1 is considered data busy, that is a data transaction initiated by data terminal T1 is still active, dialing the telephone number of data terminal T1 results in a busy tone.

Thus, when computer C1 dials the data terminal's telephone number 804, a busy tone results as shown in steps 805, 806, 807 and 808. The telephone loop of data terminal T1 is made busy during the processing of a data transaction to prevent an origination of a new data service transaction to a busy data terminal T1. Note, depending on the sophistication of data terminal T1 and computer C1 this limitation can be eliminated and multiple data calls allowed. Once again note that data terminal T1 is considered data busy even though its loop is in the on-hook condition.

Referring to FIG. 1, in the event that subscriber telephone S1 shares loop L01 with data terminal T1, the loop L01 is not made busy to telephone calls dialed to subscriber telephone S1. In such an arrangement, as shown in steps 807 through 811 of FIG. 8, the telephone number of subscriber telephone S1 is different from that of data terminal T1 even though they share the same telephone loop L01. Such an arrangement is implemented in a manner similar to well known existing two-party telephone loop arrangements. Thus, switching machine SW1 is arranged to recognize the telephone number of subscriber telephone S1 and to associate it with loop L01. When the telephone number of subscriber set S1 is dialed by a party the busy status of subscriber set S1 is checked 809. If subscriber set S1 is busy a busy tone is returned to the caller 810, otherwise a ring signal is applied 811.

Switching machine SW1 is also arranged to recognize a third telephone number which it interprets as a computer reoriginate request number. When computer C1 dials this reoriginate telephone number, the steps 804, 805, 806 and 812 of FIG. 8 result in a ringing signal being applied to data terminal T1. Switching machine SW1 checks that a data transaction is active before ringing terminal T1.

Assuming that the reoriginate number is dialed common control CC generates a connect signal 812 which establishes a network path 813 in switching network SN1. Data terminal T1 rings 814 and a path is completed 815 when data terminal T1 goes off-hook. Data terminal T1 recognizes a carrier tone 816, indicating a valid computer C1 to data terminal T1 communication path exists and resets its timer (306 of FIG. 3). Computer C1 sends data 817 and data terminal T1 acknowledges the data reception 818 and the process continues to step B as described in FIG. 5.

Figure 9:
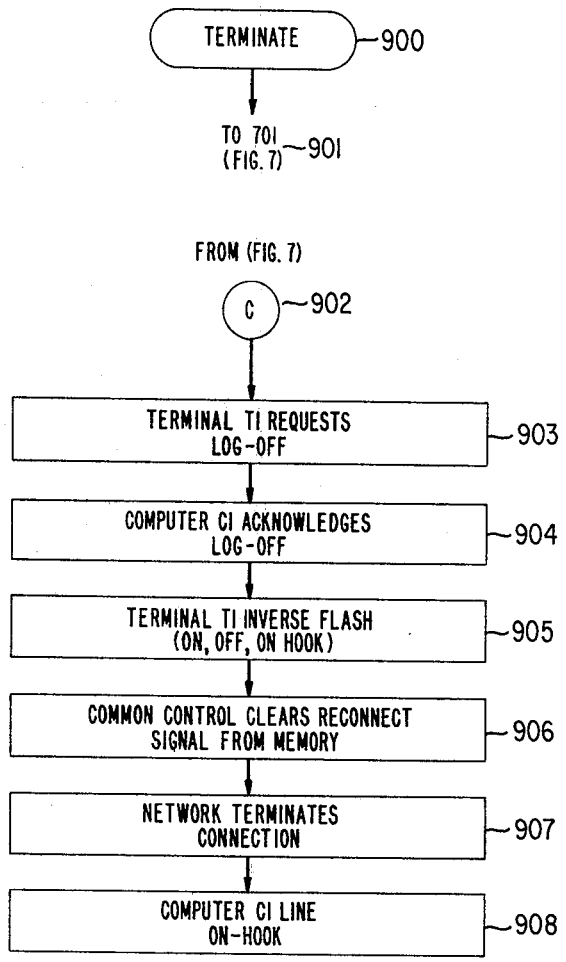
FIG. 9 illustrates the operational sequence for a terminate data transmission from the calling data terminal.

Terminate—FIG. 9

As noted previously a data service transaction remains active from the origination data call until a termination data call independent of the on-hook or off-hook status of data terminal T1. The origination data call logs-in data terminal T1 to computer C1 while the termination data call logs-out data terminal T1 to computer C1. With reference to FIG. 9 it is noted that the terminate data call includes a reoriginate data call sequence 901–902 described previously in FIG. 7. Thus, data transmissions between data terminal T1 and computer C1 could precede the log-off request 903 from data terminal T1. The log-off data is entered via data entry unit 301 of FIG. 3 and a Send key (not shown) generates send signal 309. Computer C1 acknowledges this log-off request 904 and hence the data service call is completed. An inverse switchhook flash signal 905 is given by data terminal T1 to alert switching machine SW1 that any subsequent data call from data terminal T1 is an originate call rather than another reorigination call. An End key (not shown) of data entry unit 301 of FIG. 3 generates an end signal 311 which enables switchhook control 308 to generate the inverse switchhook flash signal. The inverse flash is accomplished by having data terminal go on-hook followed by a quick off-hook back to on-hook sequence. Other types of telephone signaling could also be used to signal a terminate condition to switching machine SW1. Switching machine SW1 clears the reconnect signal in call memory CM 407, terminates the connection 907 and an on-hook condition 908 is established on the telephone loop to computer C1. An on-hook condition indicates to computer C1 that the connection is terminated. Additionally, a timer circuit (not shown) in data terminal T1, activated during the last reoriginate data call, could be arranged to give a terminate signal after a fixed period of time thus terminating the data transaction.

With reference to FIG. 3, some of the various units shown as part of data terminal T1 can also be incorporated as part of adjunct unit A1 which can interface standard data terminal ST1 to telephone loop LO1. In such an arrangement the connections to adjunct A1 would utilize the RS-232 connector available on a standard data terminal ST1. The functions of the various units 304, 305, 306, 307 and 308 of FIG. 3 can be implemented using standard well known analogue and logic circuit design techniques.

Additionally, some of the functional units of adjunct A1 can be incorporated into the design of switching machine SW1 where they can be shared among several data terminals using scanner S1 and distributor D1.

Returning to FIG. 1, switch LS1 enables use of loop LO1 by either data terminal T1 or subscriber telephone set S1. If subscriber set S1 is a key telephone set switch LS1 can be implemented as one of the line pick-up keys. Additionally, if subscriber set 300 of data terminal T1 is a key telephone, it could be wired to serve as both subscriber set 300 (of FIG. 3) for data terminal T1 as well as voice subscriber set S1 (of FIG. 1). If a key telephone set is utilized, a user sharing loop LO1 between voice and data services can be provided with the visual status of both the voice and data services. The visual status using the line button lamps would minimize any simultaneous voice and data transmission service requests.

The disclosed voice and data switching arrangement enables the conversion of the long holding time of an interactive type data service call into multiple short holding time data calls enabling the telephone loops, trunks and switching machines of the telephone network to handle data calls without significantly adding to the telephone traffic or affecting the call blocking rate. The above description is illustrative of my invention; other embodiments or arrangements known to those skilled in the art could provide similar functions without deviating from the scope of the disclosed invention.

I claim:

1. A telecommunications system for providing data transmission on each of a plurality of communication lines having subscriber apparatus connected thereto, said telecommunication system comprising:

a switching network for controlling the connection of a communication path among said communication lines or between said communication lines and a trunk to another switching network in response to control signals;

a system control circuit connected to said switching network and to said plurality of communication lines for monitoring and controlling conditions on said communication lines and applying connect and disconnect control signals to said switching network;

said system operable for establishing data transmission connections as well as voice transmission connections, and characterized in that said control circuit includes a call memory, means responsive to an origination signal of a call received over a first one of said communication lines for generating a connect control signal, means for determining if said origination signal is associated with a data transmission connection, means responsive to a determined data transmission origination signal for generating an associated reconnect signal, means for storing said reconnect signal in said call memory, means responsive to a reorigination control signal of a subsequent data transmission call received over said first communication line for obtaining said reconnect signal from said memory, and means controlled by said obtained reconnect signal for generating said connect control signal for establishing a new data transmission connection independent of any previously established data transmission connection.

2. The telecommunication system of claim 1 characterized in that said control circuit further includes means responsive to a data termination signal of a subsequent data transmission call received over said first line for generating a disconnect control signal, and means controlled by said generated disconnect control signal for canceling said reconnect signal from said memory.

3. The telecommunication system of claim 1 characterized in that said control circuit further includes means for enabling a subsequent data transmission call to a data busy subscriber on said first one of said communication lines from a second subscriber previously called by said subscriber on said first one of said communication lines, said means including means responsive to a reorigination telephone number associated with said data busy subscriber for generating a connect control signal.

4. The telecommunication system of claim 1 characterized in that said reconnect signal obtaining means is responsive to a reoriginate control signal which includes an on-hook to off-hook signal transition on said first communication line.

5. The telecommunication system of claim 1 characterized in that said disconnect control signal generating means is responsive to a data termination signal which includes a momentary off-hook signal condition on said first communication line.

6. A data terminal for communicating with another data device over a telecommunication system, said system having switchable data communication facilities established under control of dialing signals, said data terminal comprising:

a dialing circuit for generating dialing signals;

a data entry circuit for inputting data to be communicated by said data terminal;

a data buffer circuit connected to said data entry circuit for storing said inputted data;

a modem circuit connected to said data buffer for communicating the contents of said data buffer over said facility of said system upon reception of a carrier signal over said facility;

characterized in that said data terminal further includes means connected to said facility for detecting the presence of data on said facility;

timing means connected to said detecting means for generating an on-hook signal when data is absent on said facility for a prescribed time period;

switchhook control means connected in series with said facility for controlling the connection of said data terminal to said facility, said connection being made upon reception of an on-hook signal and a disconnection being made upon reception of an off-hook signal;

said data entry circuit further including a send signal means for generating an off-hook signal to said switchhook control means; and said data terminal initially requesting a data communication facility to another data device upon operation of said send signal means and said dialing circuit whereupon said data from said data buffer circuit is transmitted, said facility disconnected by said switchhook control means in response to an on-hook signal from said timing means, each subsequent request for a data facility connection with said another device being initiated by said send signal means, and each subsequent disconnection resulting in response to said on-hook signal from said timing means.

7. The data terminal of claim 6 characterized in that said data terminal further includes end signal means for generating an off-hook signal followed by an on-hook signal to said switchhook control means.

8. The data terminal of claim 6 characterized in that said data terminal further includes a busy detector for generating an on-hook signal upon reception of a busy signal over said connected data facility.

9. An arrangement including a switching network for providing a switchable data communication path between two communicating data devices, said switching network enabling a connection or disconnection in response to network control signals associated with each data call characterized in that said arrangement further comprises:

means for recognizing an origination data call from a call initiating data device and for generating a connect network control signal from data received during said origination data call;

means for storing said connect network control signal;

means for recognizing a reorigination data call from said call initiating data device and for establishing a new connection independent of any previously established connection between said data devices using said connect network control signal from said storing means;

means for recognizing a termination data call from said initiating data device and for generating a disconnect network control signal; and means responsive to said recognized termination data call for clearing said connect network control signal from said storing means.

10. The arrangement of claim 9 characterized in that
said reorigination call recognizing means includes a circuit responsive to an on-hook to off-hook signal transition from said call initiating data device.

11. The arrangement of claim 9 characterized in that
said termination call recognizing means includes a circuit responsive to a momentary off-hook signal condition from said initiating data device.

12. A telecommunication arrangement for providing a data transmission capability over existing telephone communication lines, said telecommunication arrangement comprising:

a data terminal for communicating with another data device over a switchable path under control of dialing signals from said data terminal, said data terminal including a dialing circuit for generating dialing signals, a data entry circuit for inputting data to be communicated by said data terminal, a data buffer connected to said data entry circuit for storing said inputted data, and a modem circuit connected to said data buffer for communicating the contents of said data buffer over said first communication line upon reception of a carrier signal over said first line;

a switching machine for establishing said switchable path connecting said first line from said data terminal to a second line from said data device under control of said dialing signals, said switching machine including a switching network for controlling the connection path between said first and said second lines in response to control signals, a system control circuit connected to said switching network and to said first and second lines for monitoring and controlling conditions on said first and second lines and applying connect and disconnect control signals to said switching network, and said system operable for establishing data transmission connections as well as voice transmission connections;

characterized in that said data terminal further includes means connected to said first line for detecting the presence of data on said first line, timing means connected to said detecting means for generating an on-hook signal when data is absent on said first line for a prescribed time period, switchhook control means connected in series with said first line for controlling the connection of said data terminal to said first line said connection being made upon reception of an on-hook signal and a disconnection being made upon reception of an off-hook signal, a send signal means for generating an off-hook signal to said switchhook control means, and said data terminal operable to generate an origination signal for requesting a data communication line connection to another data device, said origination signal including a signal from said send signal means and said dialing circuit whereupon said data from said data buffer circuit is transmitted, said line disconnected by said switchhook control means in response to an on-hook signal from said timing means, each subsequent request for a data line connection with said another device being initiated by a reorigination signal from said send signal means, and each subsequent line disconnection resulting in response to said signal from said timing means; and said control circuit of said switching machine further including a call memory means responsive to said origination signal of a call received over a first one of said communication lines for generating a connect control signal, means for determining if said origination signal is associated with a data transmission connection, means responsive to a determined data transmission origination signal for generating an associated reconnect signal, means for storing said reconnect signal in said call memory, means responsive to a reorigination control signal of a subsequent data transmission call received over said first communication line for obtaining said reconnect signal from said memory, and means controlled by said obtained reconnect signal for generating said connect control signal.

13. The telecommunication arrangement of claim 12 characterized in that
said control circuit further includes means responsive to a data termination signal of a subsequent data transmission call received over said first line for generating a disconnect control signal, and means controlled by said generated disconnect control signal for removing said reconnect signal from said memory.

* * * * *